United States Patent
Segal et al.

(10) Patent No.: US 10,380,493 B2
(45) Date of Patent: Aug. 13, 2019

(54) SYSTEM AND METHOD FOR GENERATING MACHINE-CURATED SCENES

(71) Applicant: Essential Products, Inc., Palo Alto, CA (US)

(72) Inventors: Mara Clair Segal, San Francisco, CA (US); Manuel Roman, Sunnyvale, CA (US); Dwipal Desai, Palo Alto, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/604,226

(22) Filed: May 24, 2017

(65) Prior Publication Data

US 2018/0300645 A1  Oct. 18, 2018

Related U.S. Application Data

(60) Provisional application No. 62/503,251, filed on May 8, 2017, provisional application No. 62/486,378, filed on Apr. 17, 2017, provisional application No. 62/486,370, filed on Apr. 17, 2017.

(51) Int. Cl.

| G06N 7/02 | (2006.01) |
|---|---|
| G06N 7/04 | (2006.01) |
| G06N 7/06 | (2006.01) |
| G06N 7/08 | (2006.01) |
| G06N 5/04 | (2006.01) |
| H04L 29/08 | (2006.01) |
| H04W 84/12 | (2009.01) |

(52) U.S. Cl.
CPC .............. *G06N 7/023* (2013.01); *G06N 5/048* (2013.01); *H04L 67/22* (2013.01); *H04L 67/12* (2013.01); *H04W 84/12* (2013.01)

(58) Field of Classification Search
CPC ....... G06N 7/023; G06N 5/048; H04W 84/12; H04L 67/22; H04L 67/12
See application file for complete search history.

(56) References Cited

U.S. PATENT DOCUMENTS

| 8,700,392 | B1 | 4/2014 | Hart et al. | |
|---|---|---|---|---|
| 9,122,913 | B2 | 9/2015 | Miller | |
| 9,792,901 | B1 | 10/2017 | Shirin et al. | |
| 2003/0033228 | A1* | 2/2003 | Bosworth-Davies | ........................ G06Q 20/04 705/35 |

(Continued)

OTHER PUBLICATIONS

Non-Final Office Action dated Feb. 8, 2018 for U.S. Appl. No. 15/672,027 of Segal et al. filed Aug. 8, 2017.
U.S. Appl. No. 15/672,027 of Segal et al. filed Aug. 8, 2017.

*Primary Examiner* — Scott A. Waldron
*Assistant Examiner* — Ababacar Seck
(74) *Attorney, Agent, or Firm* — Perkins Coie LLP

(57) ABSTRACT

The present disclosure contemplates a variety of improved methods and systems for creating a unique user experience using an ambient operating system connected to a variety of disparate IoT devices. The described solution includes a curated scene or set of actions initiated by an assistant device. For example, the assistant device detects it is a weekday morning and initiates actions associated with the wakeup routine such as opening the blinds, making coffee and notifying the user of the current traffic report.

18 Claims, 6 Drawing Sheets

(56) References Cited

U.S. PATENT DOCUMENTS

| | | | |
|---|---|---|---|
| 2008/0249801 A1* | 10/2008 | Zaleski | A61B 5/0006 705/2 |
| 2011/0022312 A1* | 1/2011 | McDonough | G01C 21/20 701/533 |
| 2011/0137836 A1* | 6/2011 | Kuriyama | A61B 5/1118 706/12 |
| 2011/0193966 A1* | 8/2011 | Golan | H04N 7/181 348/159 |
| 2012/0174006 A1* | 7/2012 | Brownell | G06Q 50/01 715/764 |
| 2013/0021459 A1 | 1/2013 | Vasilieff et al. | |
| 2013/0095459 A1* | 4/2013 | Tran | A61B 5/6816 434/247 |
| 2013/0124450 A1* | 5/2013 | Drory | G06Q 10/10 706/52 |
| 2014/0020058 A1 | 1/2014 | White et al. | |
| 2014/0104367 A1* | 4/2014 | Ryu | H04N 21/4126 348/14.07 |
| 2014/0163425 A1* | 6/2014 | Tran | G06F 19/3418 600/595 |
| 2014/0201126 A1* | 7/2014 | Zadeh | G06K 9/627 706/52 |
| 2014/0350924 A1 | 11/2014 | Zurek et al. | |
| 2016/0027470 A1* | 1/2016 | Newman | H04N 5/77 386/241 |
| 2016/0094888 A1* | 3/2016 | Peterson | H04N 21/4821 725/39 |
| 2016/0189733 A1 | 6/2016 | Vasilieff et al. | |
| 2016/0203386 A1* | 7/2016 | Porecki | G06T 11/00 382/159 |
| 2017/0193996 A1 | 7/2017 | Zurek | |

* cited by examiner

SYSTEM AND METHOD FOR GENERATING MACHINE-CURATED SCENES

CLAIM FOR PRIORITY

This application claims priority to U.S. Provisional Patent Application No. 62/503,251, entitled "System and Method for Generating Machine-Curated Scenes," by Segal et al., and filed on May 8, 2017, which is incorporated herein by reference in its entirety.

TECHNICAL FIELD

The present disclosure contemplates a variety of improved methods and systems to generate assistant device curated scenes.

BACKGROUND

The Internet of Things (IoT) allows for the internetworking of devices to exchange data among themselves to enable sophisticated functionality. For example, assistant devices configured for home automation can exchange data with other devices to allow for the control and automation of lighting, air conditioning systems, security, etc. Existing solutions require users to select individual devices, and ascribe settings to them one-by-one, potentially within a menu format.

SUMMARY

The present disclosure contemplates a variety of improved methods and systems for creating a unique user experience using an ambient operating system connected to a variety of disparate IoT devices. The described solution includes generating curated scenes or sets of actions initiated by an assistant device. The assistant device can detect a set of activities and generate a scene, allowing the user to perform the activity set automatically. For example, on a weekday morning, the assistant device initiates actions associated with a wakeup routine such as opening the blinds, making coffee and notifying the user of the current traffic report. In at least one embodiment, the scenes include providing services or content available via the home device software or through third-party integration.

Some of the subject matter described herein includes a method for automatically generating scenes for an assistant device to cause one or more devices to perform functionality automatically within an environment, comprising: receiving use information indicating user activity related to the functionality of one or more home devices within the environment, the one or more devices communicatively coupled with the home assistant device via a wireless local area network (WLAN); determining an activity pattern using the use information and external information indicating a set of activity grouping of user activity; determining using fuzzy matching that the user activities in the activity pattern related to the one or more devices in the environment match the elements of a scene template; determining a user associated with the activity pattern; generating a scene comprising one or more triggers to initiate the scene, the user, and the activities; and performing the automated activities of the scene in response to the trigger associated with the user, using the assistant device and the one or more devices within the environment that are capable of performing the activities.

Some of the subject matter described herein includes a method for automatically generating scenes for an assistant device to cause one or more devices to perform functionality automatically within an environment, comprising: receiving use information indicating user activity related to the functionality of one or more devices within the environment, the one or more devices communicatively coupled with the home assistant device via a wireless local area network (WLAN); determining an activity type, a device identifier, a functionality, and a location of each user activity representing user engagement with the one or more devices, the location representing the location of the one or more devices, and the functionality representing an operation of the one or more devices; determining an activity pattern using the activity type, the device and the location of each activity, the activity pattern representing sequence of related user activities using the use information and external information indicating contextual information about the user activities related to the functionality of one or more devices within the environment; determining using fuzzy matching that the activity type, the device and the location of each activity in the activity pattern related to the one or more devices in the environment match a scene element activity type, a scene element device type and a scene element location of each element of a scene template representing a standardized set of activities associated with a use; determining a user associated with the activity pattern; generating a scene comprising one or more trigger representing the instruction for a initiating the scene, the user indicating the user associated with the scene, and the activities including activity type, functionality, and device identifier; and performing the automated activities of the scene in response to the trigger associated with the user, using the assistant device and the one or more devices within the environment that are capable of performing the activities Some of the subject matter described herein includes a method, comprising: receiving use information indicating user activity within an environment; determining, via a processor, an activity pattern using the user information; generating a scene matching the activity pattern; and providing instructions to one or more devices to perform the activities associated with the scene.

DETAILED DESCRIPTION

Figure 1:
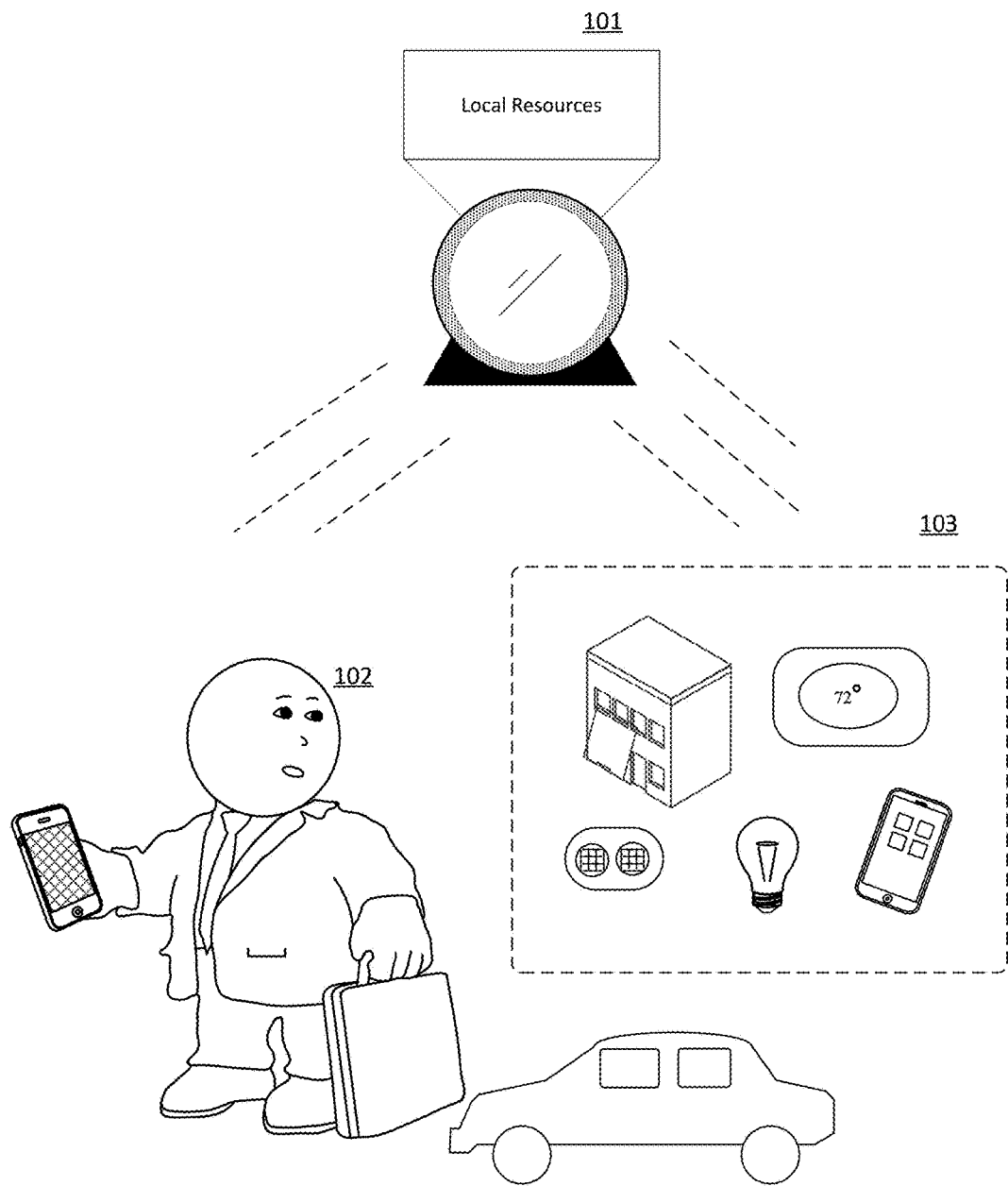
FIG. 1 illustrates an embodiment of the assistant device monitoring a user's device use.

A home can include many different electronic devices capable of providing different functionalities for a user. For example, a person waking up in the morning might open her blinds, prepare some coffee with a coffee machine, turn on the television and switch it to a news channel, and read a current traffic report on her tablet providing details on her commute to work that morning. This means that the user has a routine in which the same functionalities of the devices in the environment of her home are expected to be performed at the same day and same time. Other times, the user might engage in some activity many times, but not at a routine schedule. For example, the user might have a movie night on a Thursday at 7:30 PM and then another movie night on a Saturday at 11:00 PM. However, movie night on the different days might involve similar functionalities to be performed by the devices in the home, such as dimming the lights in the living room, turning on the television and opening a streaming video application to play back a movie, and turn on the sound system to play back audio at a certain volume. The user can use these devices manually or request an assistant device within the home to control the corresponding devices to perform the functionalities.

As disclosed herein, the assistant device can identify the functionality performed by the devices as requested or performed by the user (i.e., monitor the use of the devices within the home) and collect information regarding what is happening within the environment of the assistant device, for example, what the user is speaking, what activities other than functionality of the devices are occurring, other people within the environment, etc. All of this information can be filtered such that the relevant information related to the functionality of the devices can be provided as an activity pattern. For example, the related functionality (e.g., the user's morning routine) can be determined as the relevant information. The activity pattern can then be compared with a library of scene templates each representing corresponding functionalities of devices as well as device types, time the functionalities were performed, the users within the environment, etc. for different events (e.g., morning, movie night, etc.). Based on similarities between the activity patterns and the scene templates, the assistant device can generate a scene that indicates how and when the functionalities of the devices should be performed. Additionally, the scene can be associated with a "trigger" such as a phrase (e.g., "movie night") so that the user can recite the phrase for the assistant device to then control the various devices to perform the functionalities. When a new device is detected within the home, the assistant device can also determine its functionalities, characteristics, location, etc. and it can modify the scene to incorporate using the new device. As a result, new devices and their functionalities can be easily included within the user's routine as provided via the automated devices.

An assistant device can perform a set of actions associated with scenes. Scenes can include events which occur though the day (e.g., bedtime, morning, movie night, etc.). Thus, users can use the disclosed features to customize their homes to create an automated home environment. The home environment can include any physical environment within the range of the assistant device, a short range wireless network, and/or a wireless network provided by or used by the assistant device. The connected devices can be connected to the assistant device using short range wireless network, and/or a wireless network. In at least one embodiment, the devices are connected to the assistant devices using one or more of LTE, LTE-Advanced, Wi-Fi, Bluetooth, ZigBee, EnOcean, Personal area networks, TransferJet, Ultra-wideband, WiMAX, HiperMAN, Li-Fi and/or IR.

An assistant device can be set up in a home environment to provide speech-based responses to a user's speech. In some embodiments, the devices connected to the assistant device can be associated with one or more of voice activatable commands, device categories, descriptive information, and activity types. The information associated with one or more connected devices such as voice activatable commands, device categories, device description, and activity types can be stored in a database accessible to the assistant device. Furthermore, one or more adapters can be stored, which allows the assistant device to operate the one or more devices. In an embodiment, the users of the assistant device can control the connected devices via one or more of speech, physical gesture (e.g., mouthing 'turn off', moving hand in a specific pattern, looking at the assistant device with a specific expression, by providing some physical action, etc.), and/or textual input.

In at least one embodiment, the assistant device has access to a database which stores a list of connected devices and one or more of the associated adapters, the activity types, device descriptions, and/or device categories. In an embodiment, during the setup of the connection between the assistant device and the one or more devices, one or more of the associated adapters, the activity types, device descriptions, and/or device categories are identified and stored in the database. This information can then be accessible to the assistant device and used for controlling the devices via the assistant.

For example, a smart thermostat connected to the assistant device can be controlled by user instruction. Once the user provides the user instructions "assistant device, please set the temperature to 72 degree on the thermostat," the assistant device can identify voice activatable commands for the device such as voice activatable commands to control functions of the thermostat that set temperature, increase heat, or decrease heat. The user operation of the device can include oral speech, such as the user instruction "set the temperature to 72 degrees," which causes the assistant device to set the thermostat to 72 degrees.

The device description identified within the user instructions can indicate which device the user intends to control. The device description can include identifying information about the device. The assistant device can store device descriptions about the devices such as the device location, type, and/or color (e.g., kitchen, toaster, silver, etc.). In an example, the user provides an instruction "turn on the Cuisinart coffee maker please." The assistant device determines that "Cuisinart" is the device description of one of the two previously identified adapters that match "coffee maker" and "turn on", then narrows down the adapters to one unique adapter. In an embodiment, the assistant device can use the one or more of the adapters associated with devices, the activity types, device descriptions, and/or device categories to generate machine curated scenes.

FIG. 1 illustrates an embodiment of the assistant device monitoring user's device use. In a home environment, a user 102 may interact with many devices 103. In an embodiment, the assistant device 101 can collect the interaction information. For example, the assistant device can collect that a user turned on the bedroom lights at 7 a.m. and made coffee at 7:15 a.m. The assistant device 101 can collect the use information including identifying information about the user performing the use (e.g., user A, user B, etc.), the device used (e.g., microwave, thermostat, speaker, etc.), the functionality of the device initiated during the use (e.g., turn on, turn off, raise volume, etc.), the time, the date, and the duration of use (e.g., 2 minutes, 15 seconds, etc.). The use information can include instructions to the home device to control a device (e.g., "turn on the Cuisinart coffee maker please"), a user's manual use of devices (e.g., user turning on the coffee maker herself) and/or occurrences within the environment (e.g., alarm clock ringing).

The use information collected can include metadata, device communication data, audio data and video data, voice activatable commands, device category, and/or device descriptions. Collected audio and video data can include data collected by the microphone and/or camera of the assistant device. The audio and video data can also include data collected by devices connected to the assistant device such as an external camera. In an embodiment, the video data is the result of a visual recognition analysis of video input. The visual recognition can be based on analyzing image frames.

The audio data can include a result of an audio recognition analysis of audio data. The audio recognition algorithm can include speech recognition algorithms including one or more of Hidden Markov models, dynamic time warping-based speech recognition, neural networks, deep feedforward neural networks, end-to-end ASRs, and/or other similar algorithms.

In some embodiments, not all collected data is stored as use information. In at least one embodiment, only relevant use information is stored as use information. The relevancy of information can be determined by the temporal proximity of data to a use of a device. For example, video and audio data may be determined to be irrelevant if no use of a device occurred within a specific amount of time. In other words, the audio and video data of a user walking around the living room 20 minutes before turning on the coffee maker can be determined to be irrelevant. In at least one embodiment, specific information such as audio data generated by specific sources can be determined to be irrelevant. For example, audio data generated by a television or radio may be determined to never be relevant, and therefore is not stored with use information. In some embodiments, the relevancy of information determined by spatial proximity can be a factor in determining whether the information is relevant. For example, the audio and video data collected from the living room can be determined to be irrelevant to the use of the coffee maker in the kitchen. In some embodiments, only data by specific users is considered relevant. For example, data about the movement of a child can be determined to be irrelevant. Furthermore, movements such as the movement of a pet can be determined to be not relevant data and therefore not stored as use information.

In some embodiments, the assistant device collects all available data and then stores only the information within a specific temporal threshold of the device use (e.g., lights turned on, TV turned off, locked deadbolt, etc.). For example, the assistant device collects all information and then deletes it unless it is information collected from one minute before until one minute after a device use occurs. In some examples, this data is further analyzed to determine relevancy, and only relevant information is stored as use information.

In some embodiments, the video and audio data is further analyzed to generate a transcript. The transcript can include a combination of audio input and visual input. The transcript can be stored as use information. In at least one embodiment, only relevant portions of the transcript are stored as use information. The audio and video input can also be analyzed to determine the user. In an example, a user A, while pointing to an IoT device, can make a statement to the assistant device "turn this on." The assistant device can then identify the text of the user response to include the keywords "turn on" and "this." The keyword "this" can trigger the assistant device to examine video input to determine to which device the command is being directed. The video input can be examined using a visual recognition algorithm. The result of the visual recognition algorithm can be used to determine that a user is pointing to a SmartTV.

One or more of visual recognition algorithms and/or speaker recognition algorithms can further determine that user A is the user talking. In at least one embodiment, the assistant device stores user profiles including characteristics which the device can use to identify the user. Characteristics can include biometric information including voice biometrics. Based on both the visual input and the audio input, the assistant device can then determine that the user's response includes a request to turn on the SmartTV. In the example, the assistant device can store the following entry as use information: "SmartTV, on, 4/12/2017, 10 a.m., user A, audio command."

Figure 2:
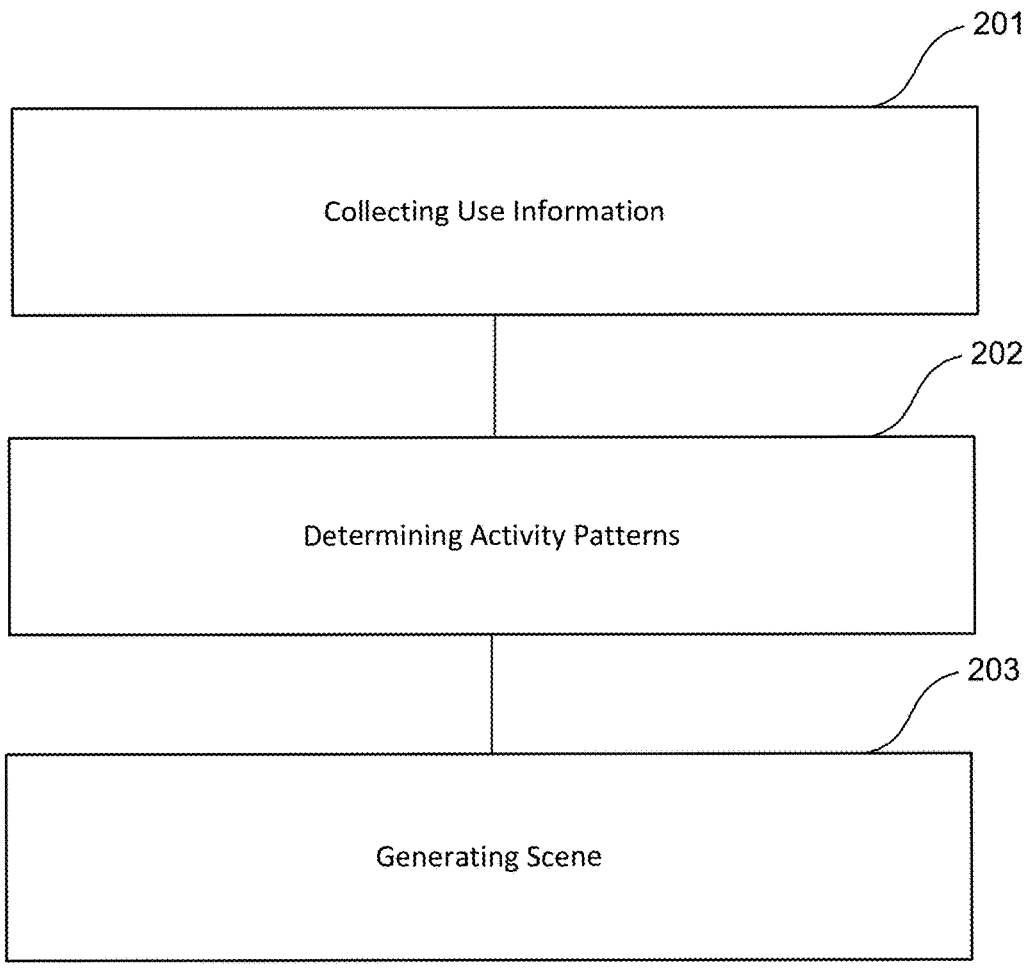
FIG. 2 illustrates the process of analyzing use information and identifying scenes.

FIG. 2 demonstrates the process of analyzing use information 201 and identifying scenes 203. Activity patterns can be determined 202 by analyzing the activities in the use information 201. Use information 201 can include user interaction with devices in the home environment. For example, use information 201 can include a user turning off the lights manually, turning off the lights via a device such as a smart phone and/or requesting the assistant device to turn off the lights. Other examples of use information 201 can include a user opening the garage door, arming the security system, closing curtains, turning off an alarm clock, making coffee, adjusting the temperature on the thermostat, etc.

The use information 201 can be analyzed by one or more machine learning algorithms. The machine learning algorithms can include one or more of decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, learning classifier systems, supervised learning, unsupervised learning, semi-supervised learning, clustering algorithm, and/or classification algorithm. In at least one embodiment, external information is used to determine activity patterns. External information can include calendar information, weather, news, and social media.

In at least one embodiment, the use information 201 be used to identify activity patterns. For example, it can be determined that the daily events or activities of a user such as opening the IoT curtains, turning on the bathroom light, using the electronic toothbrush, and turning on the coffee machine within a 20-minute window are related activities. Using calendar information, it can further be determined that the related activity pattern only occurs on weekday mornings. The activity pattern can be determined using a fuzzy matching algorithm. An activity pattern can be determined when the match is less than perfect. In at least one embodiment, a match threshold can be set.

In another example, it can be determined that the television being turned on in the evening, dimming the lights and making popcorn are related activities. In the example, the related activities do not occur on a scheduled interval and therefore can be determined to be related activities based on a match threshold.

In at least one embodiment, the activity pattern 202 is determined using data from multiple users. In some embodiments, the activity pattern 202 is determined specific to individual users. In at least one embodiment, activity initiated by multiple users and determined to be related can be used to determine an activity pattern 202. In at least one embodiment, the activity is determined to be related when the users interact with each other in temporal proximity to their respective actions. For example, if two users are talking and then a minute later one user performs the action of turning off the lights and the other user performs the activity of making popcorn, then these two actions can be determined to be related and identified as an activity pattern 202.

In at least one embodiment, entries from one or more calendars are used to determine details about related activities and can be used to identify the scene. For example, when it is determined that the TV is turned on in the evening, the lights are turned off and popcorn is made are related activities, the user's calendar can be reviewed for calendar entries and can be matched. In the example, it can be identified that user has a calendar entry marked "watched football game" in a temporal proximity to the related activity. In at least one embodiment, the matching of calendar entries to related activities can include identifying participants in the calendar entry and comparing to the participants in the related activity set.

Once the related activity is identified, it can be used to create a scene. A scene can include one or more actions and/or a set of actions. The actions can include the functionalities and behavior of devices and the assistant device. For example, a set of actions in a "bedtime" scene can include turning off the lights, arming the security system, and locking the deadbolt. Scenes can be initiated by a trigger or combination of triggers including a user instruction, a user gesture, selecting the scene on the screen of the assistant device or connected device (e.g., phone), a set of actions, a scheduled time, or an event (e.g., alarm clock ringing, visitor at the door, etc.). If the "bedtime" scene is configured, the user can state "assistant device, it's bedtime." In response to the user instruction, the assistant device can initiate the set of actions associated with the "bedtime" scene which can include turning off the lights, arming the security system, and locking the deadbolt. In another example, the user can instruct the assistant device via a physical gesture such as signing "bedtime" using American Sign Language and/or mouthing the word. This physical gesture can be set as a scene trigger and cause the assistant device to initiate the set of actions associated with "bedtime." The trigger for the "bedtime" scene can also be a set of actions such as all users in the home environment going to sleep.

In an embodiment, the assistant device monitors activity, and when an activity pattern occurs a threshold number of times (e.g., 5 times per week, twice per day, 2 times per month, etc.), the assistant device either prompts the user to set up the scene and/or automatically generates the scene. The threshold can be preconfigured. In at least one embodiment, the threshold can be adjusted based on the user. Users can have associated user profiles; the user profiles can include a patience metric. The patience metric can measure the user's capacity to tolerate system error and/or delay. For example, a user who frequently uses an angry tone, angry words, and frustrated gestures can have a low patience metric, and therefore the activity pattern match threshold can be set to higher than the system default. In at least one embodiment, each user is associated with a default patience threshold, which is adjusted based on that user's behavior over time.

In at least one embodiment the user can create a scene by providing instructions to the assistant device. The user may want to set up the scene without waiting for the assistant device to determine an activity pattern in which case the user can instructs the assistant device to create a scene by selecting devices, actions to be performed (e.g., functionalities such as turn on, turn off) and the trigger (e.g., word or set of words to activate the scene, a gesture, etc.). The user can create the scene using the display of the assistant device to provide the instructions, via verbal input, via connected device (e.g., phone) and/or physical gesture (e.g., pointing at a device, sign language, etc.). For example, the user can provide instructions "assistant device, I would like to setup a morning scene, can you help me?" In response the assistant device can reply "yes, I am happy to help you set up the morning scene. What activities should be associated with this scene?" The user can respond "The morning scene should include making coffee, opening the curtains in my bedroom and providing me with the traffic report." In response, the assistant device can ask for clarification on some of the activities or create the scene.

Figure 3:
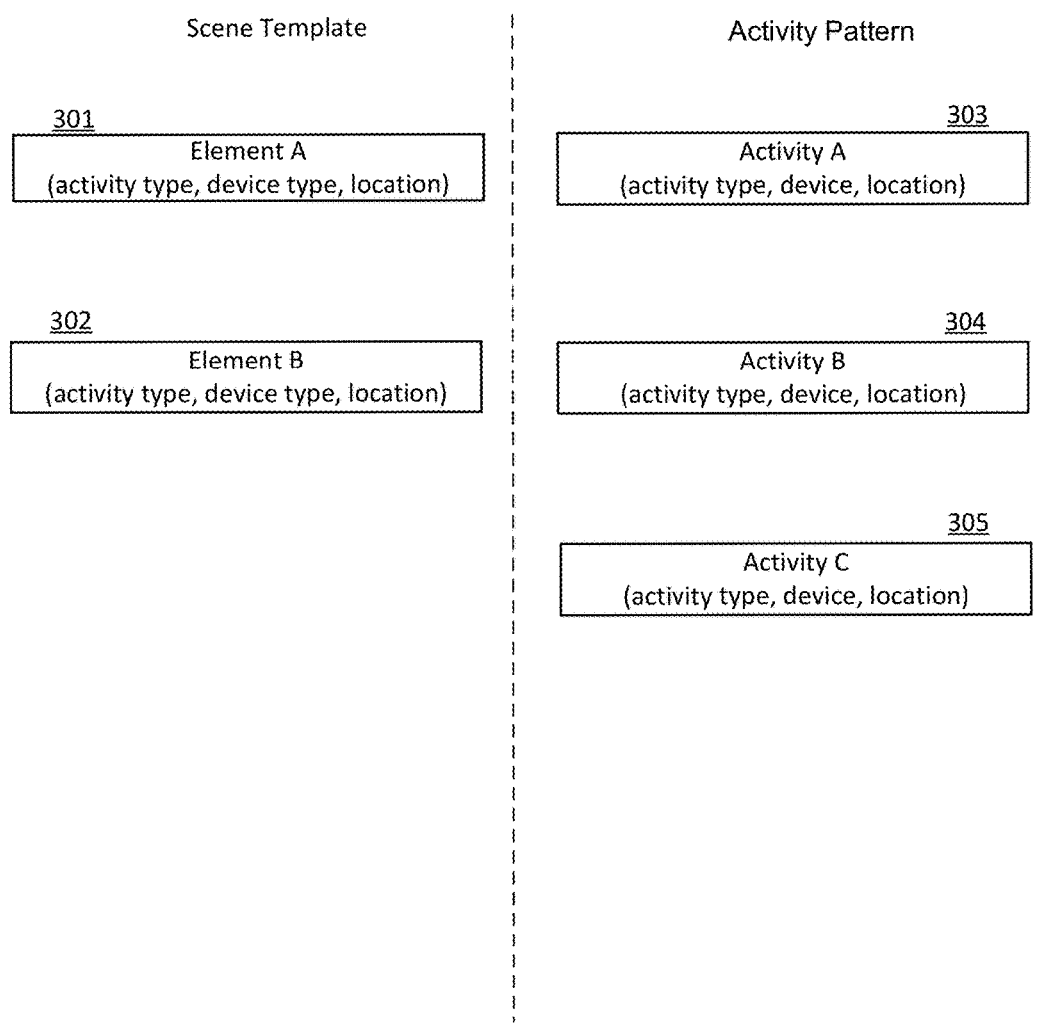
FIG. 3 illustrates an embodiment of matching a scene template to an activity pattern.

FIG. 3 illustrates matching a scene template to an activity pattern. A scene template can include a plurality of elements such as element A 301 and element B 302. Each element can include one or more of activity types and/or device categories. In the "bedtime" scene example, the "bedtime" scene template can include an element with an activity type of control lights and the device category "lights" and another element with an activity type "security" and the device category "security system." Other scene templates can exist including "wakeup routine," "movie night," "kids are sleeping," and "work from home" templates.

Each template can have predefined elements associated with the unique scene. Each template can include unique elements typical to the unique scene. In an example, the "kids are sleeping" scene template can include activity types "communication" and "illumination" and device categories "phone" and "lights." In at least one embodiment, the elements can include a location, time of day (e.g., morning, 12-2 pm, lunch time, etc.), and/or demographic information. For example, the "move night" scene template can include an element which has an activity type "illumination," device category "lights," time "evening," and location "living room."

The demographic information can be information about a user's likeliness to have activity patterns that match. For example, the use demographic information of a "playtime" scene template could be set to child user. The demographic information can include any unique information about a particular group such as adult, woman, man, child, young adult, parent, student, doctor, lawyer, etc.

The assistant device can have popular scene templates stored in the local resources. The scene templates can be matched to the activity pattern 202 to generate a customized scene for the home environment. The activity pattern 202 can be analyzed to determine the activity, activity type, the device, the device category, time, calendar day, and/or location of each activity. The activity pattern can be matched against scene templates. The matching can be accomplished using one or more data matching algorithms. The matching algorithms can include calculating a match score. In at least one embodiment, fuzzy matching is used to determine a match.

In at least one embodiment, a match is less than 100% perfect. The imperfect match can include a present threshold which is preset for all scene templates. In at least one embodiment, each scene template is associated with a threshold for a match. The number of elements associated with a scene template can be correlated to the threshold amount. For example, a scene template with seven elements can be associated with a lower match threshold than a scene template with two elements. In another example, a scene template with seven elements can be associated with a higher match threshold requirement than a scene template with two elements. In at least one embodiment, the matching includes the weighted relevance of each potential matching factor. For example, the demographic information can have a very low weight. Thus a man performing a set of actions identified in the scene template as young adult demographic activity would still yield a match.

In at least one embodiment, the match threshold can be adjusted based on the user. Users can have associated user profiles; the user profiles can include a patience metric. The patience metric can measure the user's capacity to tolerate system error and/or delay. For example, a user who frequently uses an angry tone, angry words, and frustrated gestures can have a low patience metric and therefore the scene template match threshold can be set to higher than the system default. In at least one embodiment, each user is associated with a default patience threshold, which is adjusted based on that user's behavior over time.

Once an activity pattern is determined to match a scene template, the assistant device can create a customized scene for the user. In an embodiment, once an activity pattern and scene template are found to match, the customized scene is created automatically, and the assistant device can notify the user that it has been created. For example, when it is identified that the user engaged in an activity pattern (e.g., open curtains, make coffee, turn on news) which matches the "good morning" scene template, the assistant device can tell the user "I noticed you have a morning activity pattern; I've created a scene which allows for the activities to be performed automatically. You just need to say 'initiate good morning scene.' I can also set up a different scene trigger if you'd like."

In at least one embodiment, the assistant device can prompt the user to set up the customized scene. After detecting an activity pattern and determining a matching scene template, the assistant device can prompt the user "I noticed you have a repeating morning activity pattern; would you like me to set it up so that you can perform all the actions with one trigger?" In the example, if a user responds 'yes,' the assistant device can automatically set up the customized theme, and the assistant device can further allow users to add activities and add a trigger to the customized scene. For example, the assistant device can add an activity of starting the car and opening to the garage door to the weekday morning routine. The assistant device can further allow the user to customize the trigger, including having the trigger set to an event (e.g., an alarm clock ringing, etc.).

In at least one embodiment, when a device is newly connected, the assistant device may provide an option to add the device to an existing scene. The device type, activity type and/or location of the newly connected device can be determined to match the elements of the scene template associated with a scene. Once the match is determined, the assistant device can provide an option for the user to add the newly connected device to an existing scene. For example, if a new curtain device is installed in the bedroom, the assistant device can determine that it is an element of a scene template associated with the "morning" scene and prompt the user to add the curtain device to the scene.

Figure 4:
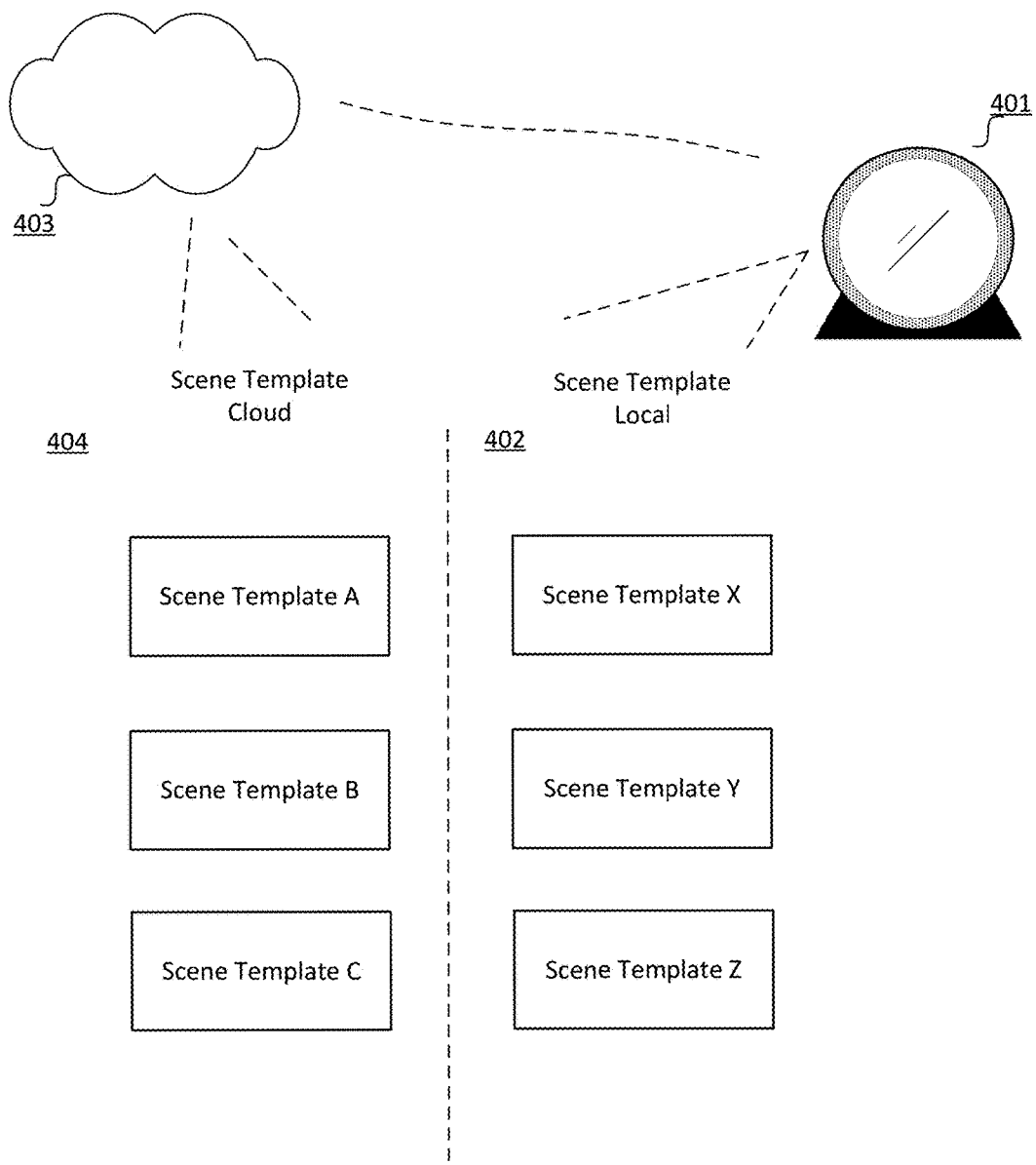
FIG. 4 illustrates scene templates stored locally and remotely.

FIG. 4 illustrates scene templates stored locally 402 and remotely 404. In some embodiments, the local storage resources are limited, and therefore to increase storage efficiently only a limited number of scene templates are stored locally 402. In at least one embodiment, all scene templates are stored on the cloud, and none are stored locally 402. Local resources of an assistant device 401 can include assistant device local memory storage, storage directly connected to the assistant device, and/or storage of connected devices. In at least one embodiment, local resources do not include storage directly connected to the assistant device and/or storage of connected devices. In at least one embodiment, the remote server is a cloud server 403.

In one embodiment, the assistant device includes common scene templates. For example, common scene templates can include "morning routine" and "bedtime." These scene templates can be preloaded on the device. In an embodiment, the assistant device can study or analyze the home environment to determine which scene templates are likely to be the most relevant in the environment. For example, the assistant device can determine that there are children in the home and therefore identify that the scene templates associated with households having children should be loaded and/or prefetched.

The assistant device can study the home environment by performing visual recognition and/or speech recognition of the surrounding environment. That is, assistant device 401 can determine information about users by analyzing captured video of the individuals in the home environment and/or by analyzing text upon objects within its surrounding environment and then use that text to determine the information about the users in the home. In an example, the assistant device can detect information, such as age, gender, height, etc., about users in the home environment. The assistant device can also detect a children's book and determine that children live in the home. Based on the visual recognition of the text in the surrounding environment, the assistant device can determine information about the users in the home such as age and gender. The visual recognition can be based on analyzing image frames by, for example, using a camera of the assistant device. A biometric algorithm can be used to identify the age and/or gender of the individuals in the home. The visual recognition algorithm can also be used to determine information about the users of the physical environment in which assistant device is placed, and those image frames can be analyzed for content (e.g., age, gender, text upon objects depicted in the image frames) to determine information about the users in the environment. In at least one embodiment, the analysis or study of the home environment includes excluding outliers (e.g., visitor to the home, one book, etc.). In at least one embodiment, a machine learning algorithm is used to determine the information about users in the home.

In an embodiment, the assistant device can use the result of studying the home environment to determine which scene templates are likely to be the most relevant in the environment and load them from the cloud resources to the local resources. In at least one embodiment, the assistant device uses one or more results of the study of the home and/or the geolocation of the assistant device. The assistant device can determine the geolocation by Wi-Fi triangulation, GLONASS, GPS, and/or geographic location associated with the Internet Protocol (IP) address, MAC address, RFID, hardware embedded article/production number, embedded software number (such as UUID, Exif/IPTC/XMP or modern steganography), Wi-Fi positioning systems or a combination of two or more of these.

Figure 5:
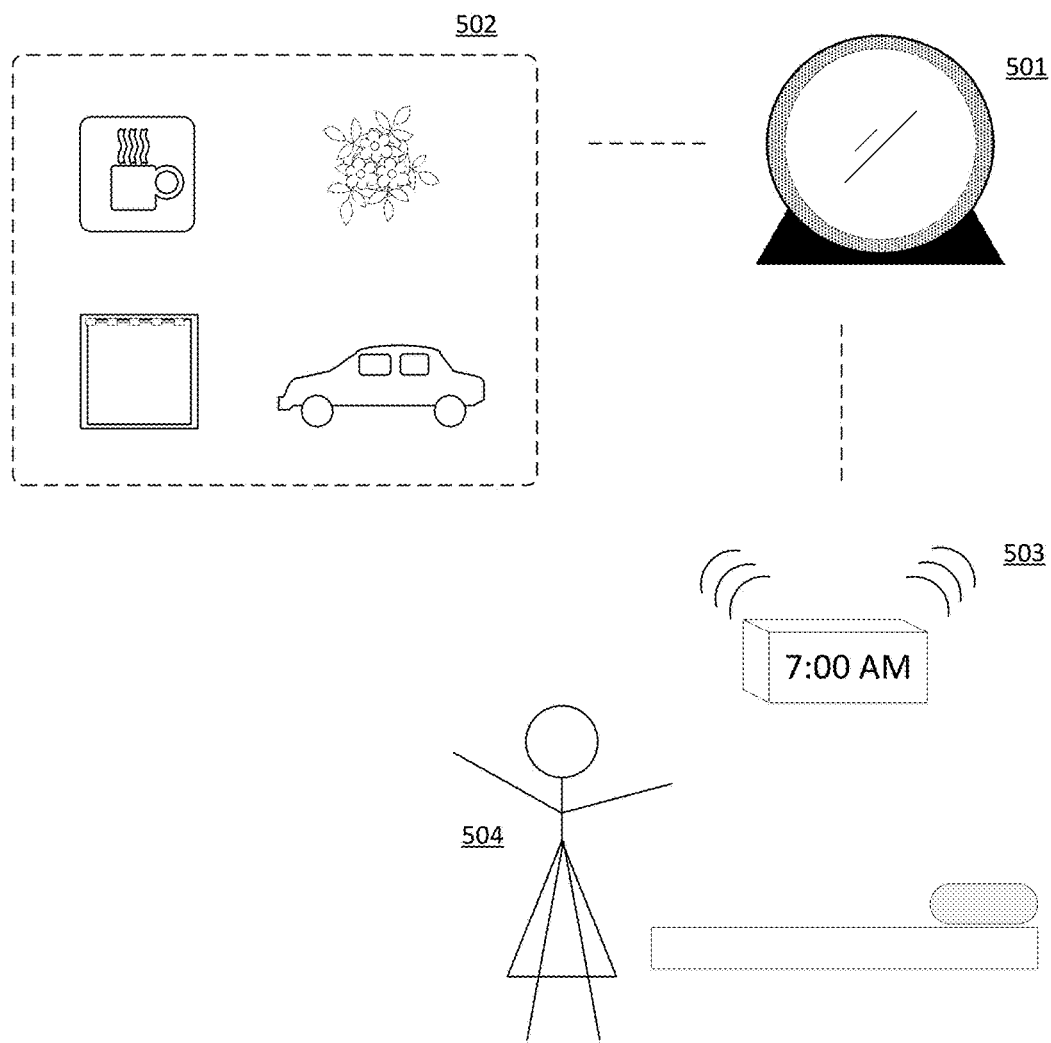
FIG. 5 illustrates an example scene curated by the assistant device.

FIG. 5 illustrates an example scene curated by the assistant device 501. Upon detecting the alarm clock sound 503, the assistant device 501 can determine that the alarm clock sound 503 is the trigger for the "morning" scene. The "morning" scene can include the assistant device 501 transmitting instructions to the relevant devices 502 in the environment to perform activities such as watering plants, making coffee, and opening the curtains. The scene can further include activities performed by the assistant device 501 such as providing a traffic report to the user 504.

The scene can further include specific times to perform certain activities. For example, the traffic report can be timed to be provided to the user 504 only after the user 504 drinks her coffee. In another example, the traffic report can be provided to the user 504 at a specific time after the alarm clock sounds (e.g., 20 minutes after alarm clock sounds, etc.).

In at least one embodiment, scenes can be preconfigured and initiated by an external source such as a news source. For example, scenes such as silver alert, amber alert, earthquake warnings, tornado warnings, and/or other natural disaster warnings can be initiated by an external source. External sources can include Integrated Public Alert & Warning System, Emergency Alert System, news sources, etc. In at least one embodiment, the trigger is the assistant detecting an Emergency Alert sent to TV and/or radio broadcasters.

Figure 6:
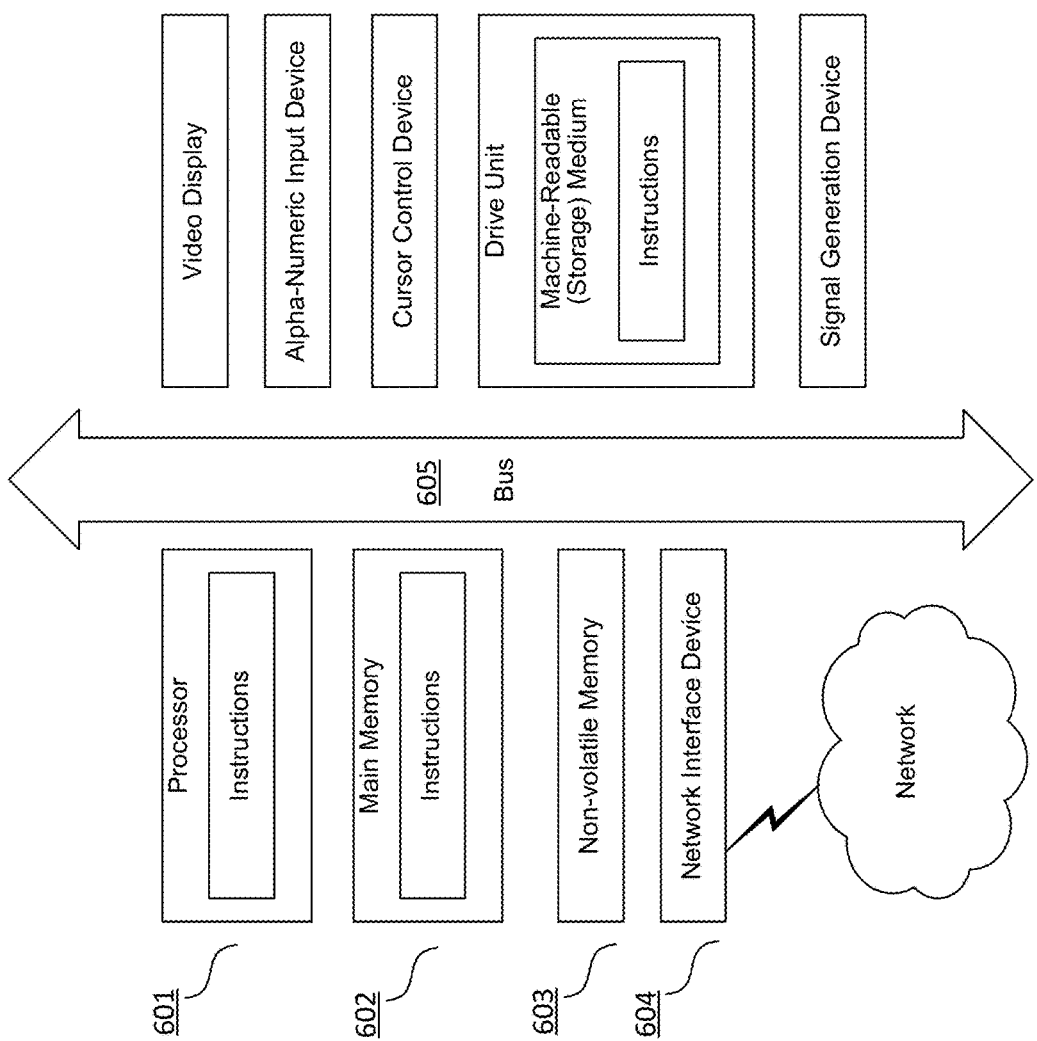
FIG. 6 illustrates an embodiment of the assistant device, including a processor, memory, non-volatile memory, and an interface device.

In FIG. 6, the assistant device includes a processor 601, memory 602, non-volatile memory 603, and an interface device 604. Various common components (e.g., cache memory) are omitted for illustrative simplicity. The assistant device is intended to illustrate a hardware device on which any of the components described in the example of FIGS. 1-5 (and any other components described in this specification) can be implemented. The components of the assistant device can be coupled together via a bus 605 or through some other known or convenient device.

In at least one embodiment, the assistant device can be operated using an ambient operating system such as a meta-operating system targeted at IoT and ubiquitous computing scenarios. Ambient OSes orchestrate ambient resources and provide a set of abstractions and APIs which simplify the development of dynamic ambient-oriented services and applications that span the reach of a single device.

The processor 601 may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory 602 is coupled to the processor by, for example, a bus. The memory can include, by way of example but not limitation, random access memory (RAM), such as dynamic RAM (DRAM) and static RAM (SRAM). The memory can be local, remote, or distributed.

The bus 605 also couples the processor 601 to the non-volatile memory 603 and drive unit. The non-volatile memory 603 is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software is typically stored in the non-volatile memory 603 and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 605 also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device. For simplicity, it is assumed that controllers of any devices not depicted in the example of FIG. 6 reside in the interface.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer's memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, this may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for automatically generating a scene for an assistant device to cause one or more devices to perform functionality automatically within an environment, comprising:
  receiving, by a processor, an image frame depicting a user interaction with a first device of one or more devices within the environment, and receiving audio information indicating the user interaction with the first device of the one or more devices within the environment, the one or more devices communicatively coupled with the assistant device via a wireless local area network (WLAN);
  using the image frame and the audio information to identify the first device of the one or more devices with which a user is interacting;
  using the image frame or the audio information identifying the functionality the user interaction causes the first device to perform;
  identifying a previous user interaction of the user causing a second device of the one or more devices to perform a second functionality which is related to the user interaction with the first device;
  determining using fuzzy matching that the previous user interaction with the second device and the user interaction with the first device matches a scene representing a standardized set of user interactions with the one or more devices in the environment;
  generating the scene associated with the scene template, and comprising a trigger representing an instruction for initiating the scene, and causing the first device, to perform the functionality associated with the user interaction, and the second device to perform the second functionality associated with the previous user interaction; and
  receiving a second image frame or a second audio information indicating the user providing the trigger associated with the scene;
  using the second image frame or the second audio information to identify the trigger associated with the scene;
  performing automatically the functionality of the first device associated with the user interaction and the second functionality of the second device associated with the previous user interaction associated with the scene responsive to receiving the trigger.

2. A method, comprising:
  receiving, by a processor, an image frame depicting a user interaction with a first device of one or more devices within the environment, and receiving audio information indicating the user interaction with the first device of the one or more devices within an environment, the one or more devices communicatively coupled with an assistant device via a wireless local area network (WLAN);
  using the image frame and the audio information to identify the first device of the one or more devices with which a user is interacting;
  using the image frame or the audio information to identify a functionality the user interaction causes the first device to perform;
  identifying a previous user interaction of the user causing a second device of the one or more devices to perform a second functionality which is related to the user interaction with the first device;
  determining a scene template by matching the scene template to the previous user interaction with the second device and the user interaction with the first device to a template associated with the scene, the first device, the functionality associated with the user interaction, the second device, and the second functionality associated with the previous user interaction;
  generating the scene associated with the scene template, and comprising a trigger representing an instruction for initiating the scene causing the first device, to perform the functionality associated with the user interaction, and the second device to perform the second functionality associated with the previous user;
  receiving the trigger representing the instruction for initiating the scene;
  and
  performing the functionality of the first device associated with the user interaction and the second functionality of the second device associated with the previous user interaction responsive to receiving the trigger associated with the scene.

3. The method of claim 2, wherein the scene template is determined using a fuzzy matching algorithm.

4. The method of claim 3, wherein initiating the scene causes a third device to perform a third functionality.

5. The method of claim 4, comprises receiving configuration information from a user; and wherein generating the scene includes the configuration information.

6. The method of claim 5, wherein the one or more devices are connected on a wireless network with the assistant device.

7. The method of claim 6, wherein one or more users are identified in the image frame.

8. The method of claim 7, wherein generating the scene includes associating the trigger with the one or more users who have authority to cause the scene to be performed.

9. The method of claim 8, wherein a location of the first device is determined using the image frame, and the location of the first device is used to determine the scene template.

10. An electronic device, comprising:
  one or more processors;
  memory storing instructions, wherein the processor is configured to execute the instructions such that the processor and memory are configured to:
  receive an image frame depicting a user interaction with a first device of one or more devices within the environment, and receiving audio information indicating the user interaction with the first device of the one or more devices within an environment, the one or more devices communicatively coupled with an assistant device via a wireless local area network (WLAN);
  use the image frame and the audio information to identify the first device of the one or more devices with which a user is interacting;

identify using the image frame or the audio information a functionality which the user interaction causes the first device to perform;

identify a previous user interaction of the user causing a second device of the one or more devices to perform a second functionality which is related to the user interaction with the first device;

determine a scene template by matching the scene template to the previous user interaction with the second device and the user interaction with the first device to a template associated with the scene, the first device, the functionality associated with the user interaction, the second device, and the second functionality associated with the previous user interaction;

generate the scene associated with the scene template, and comprising a trigger representing an instruction for initiating the scene causing the first device, to perform the functionality associated with the user interaction, and the second device to perform the second functionality associated with the previous user interaction;

receiving the trigger representing the instruction for initiating the scene; and performing the functionality of the first device associated with the user interaction and the second functionality of the second device associated with the previous user interaction responsive to receiving the trigger associated with the scene.

11. The electronic device of claim 10, wherein the scene template is determining using a fuzzy matching algorithm.

12. The electronic device of claim 11, wherein initiating the scene includes causing a third device to perform a third functionality.

13. The electronic device of claim 12, further comprising the processor and memory are configured to receive configuration information from a user and generate the scene including the configuration information.

14. The electronic device of claim 13, wherein the one or more devices are connected on a wireless network with the assistant device.

15. The electronic device of claim 14, wherein one or more users are identified in the image frame.

16. The electronic device of claim 15, wherein generation of the scene includes associating the trigger with the one or more users who have authority to cause the scene to be performed.

17. The electronic device of claim 16, wherein a location of the first device is determined using the image frame, and the location of the first device is used to determine the scene template.

18. A computer program product including non-transitory computer-readable storage media storing computer program instructions, execution of which by a processor causes a processing system to perform operations comprising:

receiving an image frame depicting a user interaction with a first device of one or more devices within the environment, and receiving audio information indicating the user interaction with the first device of the one or more devices within an environment, the one or more devices communicatively coupled with an assistant device via a wireless local area network (WLAN);

using the image frame and the audio information to identify the first device of the one or more devices with which a user is interacting;

using the image frame or the audio information to identify a functionality the user interaction causes the first device to perform;

identifying a previous user interaction of the user causing a second device of the one or more devices to perform a second functionality which is related to the user interaction with the first device;

determining a scene template by matching the scene template to the previous user interaction with the second device and the user interaction with the first device to a template associated with the scene, the first device, the functionality associated with the user interaction, the second device, and the second functionality associated with the previous user interaction;

generating the scene associated with the scene template, and comprising a trigger representing an instruction for initiating the scene, and thereby causing the first device, to perform the functionality associated with the user interaction, and the second device to perform the second functionality associated with the previous user interaction;

receiving the trigger representing the instruction for initiating the scene;

and performing the functionality of the first device associated with the user interaction and the second functionality of the second device associated with the previous user interaction responsive to receiving the trigger associated with the scene.

* * * * *